United States Patent Office 2,701,798
Patented Feb. 8, 1955

2,701,798

3-HYDROXY-PIPERIDINE-2-ACETIC ACID LACTONES AND METHODS FOR THEIR PREPARATION

Bernard R. Baker, Nanuet, N. Y., and Francis J. McEvoy, Nutley, N. J., assignors to American Cyanamid Company, New York, N. Y., a corporation of Maine No Drawing. Application May 29, 1952, Serial No. 290,824

15 Claims. (Cl. 260—294.7)

This invention relates to 3-hydroxy-piperidine-2-acetic acid lactone, simple derivatives thereof and methods of making the same. The new compound 3-hydroxy-piperidine-2-acetic acid lactone can be represented by the following formula:

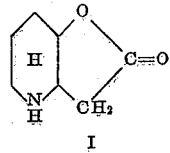

I

As will be seen from the above formula, 3-hydroxypiperidine-2-acetic acid lactone is an organic base and is, therefore, capable of forming acid addition salts with acids. These acid addition salts are usually the full equivalent of the free base and it is intended that this invention cover 3-hydroxypiperidine-2-acetic acid lactone per se as well as the acid addition salts.

The new compound 3-hydroxypiperidine-2-acetic acid lactone and the acid addition salts thereof are useful as intermediates in a new and novel synthesis of compounds having antimalarial activity of the type disclosed in copending U. S. application S. N. 184,118, filed September 9, 1950, by Bernard R. Baker and Robert E. Schaub, now abandoned. This new procedure will be fully described in subsequent paragraphs. In addition, the new compounds of this invention have other utility and, for instance can be employed as flow extenders in melamine-formaldehyde or urea-formaldehyde resins.

As disclosed in copending U. S. application S. N. 205,422, filed January 10, 1951, by Bernard R. Baker and Robert E. Schaub, the 1-acyl-3-alkoxypiperidene-2-acetic acids are useful intermediates in the preparation of alkaloids. The 1-acyl-3-alkoxy-piperidene-2-acetic acids can be represented by the formula:

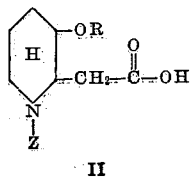

II where Z represents an acyl group and R represents an alkyl radical. The method whereby these compounds can be employed in the synthesis of alkaloids having antimalarial activity has recently been described in the published literature, for instance in "The Journal of Organic Chemistry" for January 1952. However, prior to this invention there has been no completely satisfactory method for preparing compounds of Formula II above. The available processes for preparing such compounds required the employment of uncommon and expensive starting materials and also required a long involved procedure of many difficult steps. The present invention, on the other hand, opens the door to a simple procedure for preparing compounds of Formula II above by a relatively simple method from easily available and relatively inexpensive starting materials.

It will be noticed by those skilled in the art of stereochemistry that compounds of Formula II above are capable of existing in two geometrical forms since the piperidine ring is essentially planar. While this might not be of material importance in same applications, when compounds of Formula II above are to be employed in the synthesis of antimalarial alkaloids of the type previously mentioned, it has been found that the use of the cis isomer results in alkaloids many times more active than the alkaloids prepared from the trans isomer. This invention makes possible a simple method of preparing compounds of Formula II above of the cis configuration without the production of the undesirable trans isomer.

The above-mentioned procedure for preparing the 1-acyl-3-alkoxypiperidine-2-acetic acids comprises reacting the new lactone of this invention, 3-hydroxypiperidine-2-acetic acid lactone, with an acyl halide to form the corresponding 1-acyl-3-hydroxypiperidine-2-acetic acid lactone; hydrolyzing the latter compound with NaOH (or other alkali base) to prepare the hydroxy-acid; reacting the hydroxy-acid with sodium methoxide (or other alkali metal alcoholate) to give the disodium salt; and thereafter reacting the disodium salt with an alkylhalide or an alkylsulfate to prepare the 1-acyl-3-alkoxypiperidine-2-acetic acid. This series of reactions can be illustrated by the following equations:

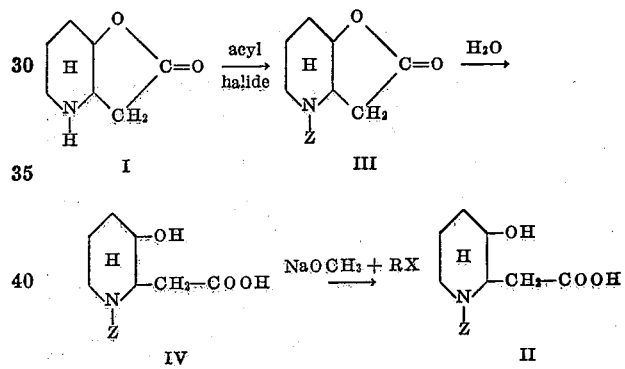

wherein X represents halogen, Z represents an acyl group, and R represents an alkyl radical. This procedure is relatively simple and is easily performed. In addition, it results in the production of only the desired cis isomer. As will be apparent to the stereochemist, upon an examination of the structural formula, the starting lactone material, represented by Formula I, is capable of existing only in the cis form, and the above procedure must, therefore, of necessity result only in the formation of cis-1-acyl-3-alkoxypiperidine-2-acetic acid and cannot result in the formation of the trans form. It should, however, be emphasized that the above procedure was discussed merely for the purpose of illustrating a novel utility for the new compounds of this invention and it is not intended that any of the reactions involved nor that any of the compounds, other than the starting material represented by Formula I, constitute a part of the present invention. In fact, compounds represented by Formulae III and IV constitute a part of the subject matter of the previously mentioned copending application S. N. 205,422.

While it is not intended that this invention be limited to 3-hydroxypiperidine-2-acetic acid lactone and its acid addition salts when they are prepared by any one particular procedure, a novel method of preparing this new class of compounds has been discovered and it is intended that this new method also constitute a part of the present invention. The new method of this invention comprises treating a 3-amino-4-hydroxy-7-haloheptanoic acid lactone salt with a base at least as strong as the amine of the heptanoic acid compound, in a reaction mixture free of compounds having hydroxy groups and preferably free of compounds other than the heptanoic acid compound having amine hydrogen. This new reaction can be illustrated by the following equation in which X represents halogen and HY represents a salt-forming acid:

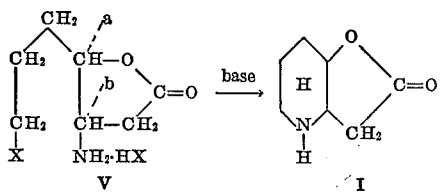

In order for the new method of this invention to be operative, the reaction mixture must be substantially free of hydroxy groups. If a solvent containing hydroxy groups, such as water or an alcohol, or if one of the usual inorganic bases such as sodium hydroxide or sodium methoxide is employed, substantially no yield of the desired lactone is obtained. While the exact reason or reasons for this are not known with certainty and while applicants do not wish to be limited by chemical theory, it appears that, in the presence of hydroxy groups, a secondary reaction becomes predominant and instead of a piperidine type compound, one obtains an ester or a salt of a tetrahydrofuryl compound of the formula:

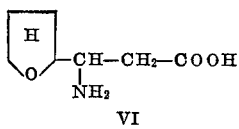

VI or else one obtains a trans isomer of 3-hydroxypiperidine-2-acetic acid or possibly a mixture of these two compounds, depending upon the nature of the starting material employed.

As will be noticed from Formula V in the equation above, the new heptanoic acid starting materials employed in the new method of this invention have two asymmetric carbon atoms labeled "a" and "b" and are, therefore, capable of existing in four optically active forms or as two distinct dl racemic mixtures. As will be apparent to those skilled in the art of stereochemistry, upon an examination of two formulae in the above equation, only one of the two possible dl mixtures in each instance is theoretically capable of forming the new piperidine lactones of this invention since the piperidine lactone should be capable of existing only in cis form. In other words, the trans lactone is theoretically impossible due to the high stresses that would result from a trans lactone configuration. Experiments confirm this theory and it has been found to be true that only one of the two possible dl mixtures in each instance is suitable for preparation of the desired lactone. For purposes of convenience, the dl racemic mixture of a compound of Formula V above capable of giving 3-hydroxypiperidine-2-acetic acid lactone is, in each instance, referred to as the dl "normal" form, and the dl racemic mixture incapable of forming the piperidine lactone is referred to as the dl "pseudo" form. It is, of course, also possible to prepare either of the two enantiomers constituting the dl normal form of a given 3-amino-4-hydroxy-7-haloheptanoic acid lactone salt in substantially pure form. These are referred to as the levo-normal form and dextro-normal form, and either enantiomer is suitable for the formation of the new piperidine lactone of this invention.

If one employs a mixture of the two dl forms of a compound of Formula V in a reaction mixture containing hydroxy groups, apparently the dl pseudo form cyclizes through the nitrogen atom as desired to give a piperidine compound, but due to the stresses that would result, the lactone ring is broken so that no piperidine lactone is formed. On the other hand, the dl normal form does not cyclize as desired to give any substantial quantity of the piperidine lactone, but rather cyclizes in an entirely different manner to give an ester or a salt, depending upon the base employed, of the tetrahydrofuryl compound represented by Formula VI. Therefore, if one employs, as a starting material, a mixture of the normal and pseudo forms of a compound of Formula V above, in a reaction mixture containing hydroxy groups, there is not obtained the desired mixture of trans-3-hydroxypiperidine-2-acetic acid and cis-3-hydroxypiperidine-2-acetic acid lactone, but rather a mixture of trans-3-hydroxypiperidine-2-acetic acid and a salt or ester of beta-tetrahydrofuryl-beta-alanine. And if one employs a pure normal form of a 3-amino-4-hydroxy-7-haloheptanoic acid lactone salt as a starting material in a reaction mixture containing hydroxy groups, one does not obtain the desired cis-3-hydroxypiperidine-2-acetic acid lactone, but instead obtains a beta-tetrahydrofuryl-beta-alanine derivative. It is only by the ingenious expediency of maintaining the reaction mixture substantially free of hydroxy groups that this new reaction can be made to yield any substantial quantity of the desired 3-hydroxypiperidine-2-acetic acid lactone.

As stated above, it is advantageous to also maintain the reaction mixture free of compounds having amine hydrogen other than the 3-amino-4-hydroxy-7-haloheptanoic acid lactone salt. There appears to be two possible reasons for this advantage. The first reason is that, in some instances, the presence of compounds having amine hydrogen appears to have, to a lesser extent, an effect similar to the presence of hydroxy groups or, in other words, to encourage the heptanoic acid compound to cyclize through the oxygen atom rather than through the nitrogen atom. The second reason is simply that one is attempting to cyclize through the amino group of the heptanoic acid compound, and the presence of other primary or secondary amine groups in the reaction mixture introduces competitive reactions which decrease the yield. As will, however, be apparent from the above discussion, the presence of unnecessary primary or secondary amino groups in the reaction mixture does not completely destroy the operability of the new process of this invention, but simply results in undesirable side reactions and lower yields.

The 3-amino-4-hydroxy-7-haloheptanoic acid lactone salts employed as starting materials in the new process of this invention can be prepared in any one of several ways, but are preferably prepared by treating a compound of Formula VI above, or an N-acyl derivative thereof, with a halogen acid. The compounds of Formula VI above are in turn preferably prepared by the method of copending U. S. application S. N. 223,456, filed April 27, 1951, by Bernard R. Baker and Francis J. McEvoy. As pointed out in the preceding paragraphs, only the normal form of a 3-amino-4-hydroxy-7-haloheptanoic acid lactone salt is suitable for preparing the new compounds of this invention and by employing the above procedure for the preparation of the heptanoic acid starting materials, it is possible to produce the desired normal form in a substantially pure state. In other words, when a beta-tetrahydrofuryl-beta-alanine compound of the type referred to in the above-mentioned copending U. S. application S. N. 223,456 as a "normal form" is treated with a halogen acid, it results in the production of a normal form of a 3-amino-4-hydroxy-7-haloheptanoic acid lactone salt suitable for use as a starting material in the new process of this invention. If an alternative method of preparing the heptanoic acid starting material is employed and a mixture of the two dl forms is obtained, the two racemic mixtures should preferably be separated and only the dl normal form employed in the process of this invention. Such a separation can, in most instances, be readily accomplished by fractional crystallization and it has been found that if such a separation is not performed and an appreciable quantity of the pseudo form of the heptanoic acid starting material is present in the reaction mixture, this material forms, under the conditions of the new process of this invention, an undesirable polymeric material. The presence of such a polymeric material in the reaction mixture makes the isolation of the desired 3-hydroxypiperidine-2-acetic acid lactone more difficult.

Practically any salt of the 3-amino-4-hydroxy-7-haloheptanoic acid lactone is satisfactory for the new process of this invention. The salts with a halogen acid corresponding to the halo substituent of the heptanoic acid compound, for instance 3-amino-4-hydroxy-7-chloroheptanoic acid lactone hydrochloride, 3-amino-4-hydroxy-7-bromoheptanoic acid lactone hydrobromide and 3-amino-4-hydroxy-7-iodoheptanoic acid lactone hydroiodide are advantageous since they are more readily prepared. Mixed salts can, however, be prepared and once prepared, they are quite satisfactory for the new process of this invention. For instance one can employ salts with organic acids as illustrated by 3-amino-4-hydroxy-7-bromoheptanoic acid lactone citrate, or one can employ salts with other mineral acids as illustrated by 3-amino-4-hydroxy-7-bromoheptanoic acid lactone sulfate. A preferred starting material for the new process of this invention is 3-amino-4-hydroxy-7-bromoheptanoic acid lactone hydrobromide. While this salt is preferred for several reasons, two primary reasons are that it is readily prepared in good yield and that the pure normal form, relatively free of the pseudo form, is readily obtained. The latter advantage is important since it enables one to employ the pure normal form as a starting material in the new process of this invention and thereby avoid the disadvantages, as previously described, of employing a mixture of normal and pseudo forms.

It will also be apparent, from the above discussion, that cis-3-hydroxy-piperidine-2-acetic acid lactone is a dl mixture of two optically active enantiomers. This mixture can be resolved, if desired, or, more conveniently, if either levo-cis-3-hydroxy-piperidine-2-acetic acid lactone or dextro-cis-3-hydroxy-piperidine-2-acetic acid lactone is desired in pure form, it can be prepared by employing as a starting material the proper optically active isomer of a normal 4-hydroxy-7-haloheptanoic acid lactone salt. The new process of this invention results in substantially no inversion and if an optically active starting material is employed, an optically active product is obtained. For instance, to prepare levo-cis-3-hydroxy-piperidine-2-acetic acid lactone, one employs as a starting material the levorotary isomer of a normal dl form of a 3-amino-4-hydroxy-7-haloheptanoic acid lactone salt and to prepare the pure dextro-cis-lactone, one employs as a starting material the dextrorotary isomer of a normal dl form of a 3-amino-4-hydroxy-7-haloheptanoic acid lactone hydrohalide.

The new method of this invention is preferably performed in an inert solvent. Almost any of the usual non-hydroxy organic solvents are satisfactory as may be illustrated by the following suitable examples: Halohydrocarbon solvents, for instance chloroform, carbon tetrachloride, and tetrachloroethane; cyclic ethers, for instance dioxane; lower aliphatic esters, for instance, ethyl acetate; and lower aliphatic ketone solvents, for instance acetone. The hydrocarbon solvents, for instance the petroleum ethers, can also be employed although they are not advantageous because of the resulting solubility problems. It should also be emphasized that one can readily conduct the new process of this invention in the absence of a solvent in many instances, for example when a liquid organic base such as N-ethylpiperidine is employed.

It is an advantage of the new process of this invention that any one of a wide variety of bases may be employed. The first requirement is that the base be one which does not contain a hydroxy group in the molecule and as previously stated, the base must be at least as strong as the amine of the 3-amino-4-hydroxy-7-haloheptanoic acid lactone salt. It has been determined that any base having a basic dissociation constant, in water at 25° C., of about $10^{-5}$ is sufficiently strong to fulfill the latter requirement and any of the common non-hydroxy alkyl amine or aralkyl amine bases are satisfactory for the new process of this invention. Aromatic amines as illustrated by aniline, dimethylaniline, and diphenylamine are generally too weakly basic to give satisfactory results and should not be employed. The preferred bases are the strong non-hydroxy tertiary amine bases as may be illustrated by triethylamine, trimethylamine, N-ethylmorpholine, N-methylpiperidine and N-methylpyrrolidine. The non-aromatic primary and secondary amines can also be employed, although as has been previously mentioned, their use introduces the possibility of secondary reactions, and is, therefore, usually not advantageous. Illustrative examples of amines of this type which can be employed are ethylamine, dimethylamine, diethylamine, and more satisfactorily, diisopropylamine. It is also possible to employ a carbonate base in an inert solvent, but only poor yields are obtained and such a procedure is not recommended.

If it is intended that the reaction go to completion, at least one mole and preferably two moles of the base should ordinarily be employed for each mole of the 3-amino-4-hydroxy-7-haloheptanoic acid lactone salt present in the reaction mixture. This is simply because the reaction releases two moles of acid for each mole of the haloheptanoic acid compound employed and it is, of course, necessary for the continuance of the reaction that this acid be neutralized as formed. Obviously, if a base is employed having more than one basic group, for instance dimethylpiperazine, then a corresponding reduction can be made in the quantity of base employed. In other words the base need only be employed in stoichiometrical quantities.

It also is an advantage of the new process of this invention that it can be conducted within a wide range of temperatures, for instance from about the freezing temperature of the reaction mixture up to about the reflux temperature of the reaction mixture. But while the reaction is accelerated by higher temperatures, side reactions are also encouraged, and for this reason it is usually advantageous to employ a reaction temperature from about 0° C. to 60° C. Room temperature, i. e., 20° C. to 30° C. is preferred, since such temperatures are easily maintained and usually result in high yields. At room temperature the reaction is substantially complete in from about twelve to forty-eight hours and at 60° C. the reaction is substantially complete in from about one to six hours. A corresponding time should be allowed at other reaction temperatures.

The invention will be more particularly illustrated by the following specific examples in which all parts are by weight.

EXAMPLE I

*Preparation of the free dl-cis-lactone*

A mixture of 30 g. of N-benzoyl-beta-furyl-beta-alanine (Ann., 389, 107), 150 cc. of ethylene glycol monomethyl ether and 5 g. of 10% palladium-charcoal catalyst was shaken with hydrogen at 2–3 atm. and 80° C. until reduction was complete (about one hour). The filtered solution is evaporated to dryness in vacuo. The crystalline residue of N-benzoyl-beta-tetrahydrofuryl-beta-alanine was heated with 300 cc. of 48% hydrobromic acid at 99° C. for twenty-four hours. The cooled, filtered solution was evaporated to dryness in vacuo. The cooled residue was stirred with 300 cc. of acetone until the gum disintegrated to crystals, then the mixture was kept at 3° C. overnight. The resulting white crystals of 3-amino-4-hydroxy-7-bromoheptanoic acid lactone hydrobromide were collected and washed with acetone. This crude material is, to a large extent, the dl normal form although a small amount of the dl pseudo form may also be present.

A solution of 1.87 g. of the crude normal dl-3-amino-4-hydroxy-7-bromoheptanoic acid lactone hydrobromide in 62 cc. of chloroform and 4.4 cc. of triethylamine was allowed to stand for twenty-eight hours, then evaporated to dryness in vacuo (bath 35° C.). The residue, dissolved in 60 cc. of chloroform was washed with 37 cc. of saturated aqueous sodium bicarbonate. The latter was extracted with two 60 cc. portions of chloroform. The combined dried chloroform soutions were evaporated to dryness in vacuo (bath 35° C.) leaving the 3-hydroxy-piperidine-2-acetic acid lactone as an oil which soon solidified to white crystals. The yield of crude material was about .088 g. Recrystallization from heptane gave white crystals having a melting point of about 94° C.–95° C. This compound is soluble in water, acetone and chloroform, but insoluble in cold petroleum ether or heptane.

In place of the 48% hydrobromic acid employed in the above example, one can employ other halogen acids, for instance 56% hydriodic acid or concentrated hydrochloric acid so that other 3-amino-4-hydroxy-7-haloheptanoic acid lactone hydrohalides are produced. The use of hydriodic acid, of course, results in the production of 3-amino-4-hydroxy-7-iodoheptanoic acid lactone hydriodide, and the use of hydrochloric acid results in the formation of 3-amino-4-hydroxy-7-chloroheptanoic acid lactone hydrochloride. An equal molar quantity of one of these heptanoic acid compounds can then be substituted for the 3-amino-4-hydroxy-7-bromoheptanoic acid lactone hydrobromide employed as a starting material in the last step of the above example.

EXAMPLE II

*Preparation of the dl-cis-lactone hydrochloride salt*

A solution of 300 mg. of 3-amino-4-hydroxy-7-bromoheptanoic acid lactone hydrobromide in 10 cc. of chloroform and 0.7 cc. of triethylamine was allowed to stand for twenty-four hours, then evaporated to dryness in vacuo (bath 35° C.). The residue was dissolved in 10 cc. of chloroform and washed with 6 cc. of saturated aqueous sodium bicarbonate. The latter was extracted with two 10 cc. portions of chloroform. The combined chloroform solutions, dried with magnesium sulfate, were evaporated to dryness in vacuo (bath 35° C.). The residue was dissolved in about 3 cc. of absolute alcoholic hydrogen chloride and kept at 0° C. for two hours. The white crystals, melting point about 217° C.–218° C. dec., of crude hydroxy-piperidine-2-acetic acid lactone hydrochloride were collected and washed with acetone. This compound is readily soluble in water, but insoluble in acetone or ether.

EXAMPLE III

*Preparation of the dl-cis-lactone hydrobromide salt*

Treatment of 3-hydroxypiperidine-2-acetic acid lactone, prepared as in Example I, in chloroform with 30% hydrogen bromide in acetic acid gave the hydrobromide salt as white crystals which were readily soluble in water, but insoluble in chloroform or ether. The melting point of the crude material was about 207° C.–208° C.

EXAMPLE IV

*Preparation of the levo-cis-lactone hydrochloride*

A mixture of 145 g. of *dl*-N-benzoyl-beta-furyl-beta-ananine, 263 g. of brucine and 1,450 cc. of absolute alcohol was heated to boiling to complete solution, then it was allowed to stand overnight. The white crystals of the brucine salt of levo-N-benzoyl-beta-furyl-beta-alanine were collected on a filter and washed with 145 cc. of absolute alcohol; yield, 164 g., $[\alpha]_D^{28}$ —46° (acetone).

A mixture of 164 g. of this brucine salt, 600 cc. of chloroform and 200 cc. of 5% sodium hydroxide was shaken until solution was complete. The separated alkaline layer was acidified. The white crystals of levo-N-benzoyl-beta-furyl-beta-alanine were collected and washed with water; yield, 54.9 g., melting point 191°C.–192° C., $[\alpha]_D$ —66.2° (0.1 N NaOH).

Levo-N-benzoyl-beta-furyl-beta-alanine was hydrogenated, then treated with 48% hydrobromic acid as described for the *dl* isomer in Example I; yield, 38%–42% of white crystals of crude normal levo-3-amino-4-hydroxy-7-bromoheptanoic acid lactone hydrobromide, melting point 203° C.–204° C. dec., $[\alpha]_D^{27}$ —36.6° (H2O).

A solution of 3.0 g. of the levo-3-amino-4-hydroxy-7-bromoheptanoic acid lactone hydrobromide in 100 cc. of chloroform and 7.1 cc. of triethylamine was allowed to stand about sixteen hours. The solution was processed as in Example II; yield, 0.93 g. (60%) of white crystals of crude levo-3-hydroxy-2-piperidine acetic acid lactone hydrochloride, melting point 234° C.–235° C. dec. Recrystallization from methanol raised the melting point to 238° C.–239° C. dec., $[\alpha]_D^{27}$—64.4° (H2O). This compound is soluble in water, but insoluble in alcohol or acetone.

As was stated to be the case in the preparation of the *dl*-cis-lactone, other halogen acids, for instance 56% HI or concentrated HCl, can be substituted for the 48% HBr employed above and an equal molar quantity of the resulting levo-3-amino-4-hydroxy-7-haloheptanoic acid lactone hydrohalide, i. e., levo-3-amino-4-hydroxy-7-iodoheptanoic acid lactone hydriodide or levo-3-amino-4-hydroxy-7-chloroheptanoic acid lactone hydrochloride, employed in place of the levo-3-amino-4-hydroxy-7-bromoheptanoic acid lactone hydrobromide of the above example.

Other salts of the levo-cis-lactone, for instance the hydrobromide, the free levo-cis-lactone or 1-acyl derivatives of the levo-cis-lactone, for instance *d*-1-benzoyl-3-hydroxypiperidine-2-acetic acid $[\alpha]_D^{31}$ +113° (abs. alc.), are prepared in the same manner as was illustrated for the *dl*-cis-lactone.

Of course, to prepare the *d*-cis-lactone salt, one need only substitute an equal molar quantity of *d*-3-amino-4-hydroxy-7-bromoheptanoic acid lactone hydrobromide, or other *d*-3-amino-4-hydroxy-7-haloheptanoic acid lactone hydrohalide, for the levo-3-amino-4-hydroxy-7-bromoheptanoic acid lactone hydrobromide employed in this example.

EXAMPLE V

This example is for the purpose of showing utility in the formation of the 1-acyl derivatives of 3-hydroxypiperidine-2-acetic acid lactone.

To a solution of 7.2 g. of crude 3-hydroxypiperidine-2-acetic acid lactone in 72 cc. of chloroform was added 21 cc. of triethylamine and 6 cc. of benzoyl chloride. After two hours the solution was washed with 1 N hydrochloric acid and aqueous sodium bicarbonate, then dried with magnesium sulfate and evaporated to dryness in vacuo. The residue was crystallized from 25 cc. of ethyl acetate by addition of 35 cc. of heptane; yield, 3.0 (24%) of white crystals of crude 1-benzoyl-3-hydroxypiperidine-2-acetic acid lactone having a melting point of about 99° C.–101° C. This compound was soluble in alcohol, ethyl acetate or chloroform, but insoluble in water or heptane.

In place of the benzoyl chloride employed in the above example, an equal molar quantity of other acid halides can be substituted to produce other 1-acyl derivatives. For instance, an equal molar quantity of benzyl chlorocarbonate can be substituted to produce 1-carbobenzoxy-3-hydroxypiperidine-2-acetic acid lactone, or an equal molar quantity of ethyl chlorocarbonate to produce 1-carbethoxy-3-hydroxypiperidine-2-acetic acid lactone.

EXAMPLE VI

This example is to illustrate a procedure whereby the 1-acyl derivatives can be prepared without isolation of the free 3-hydroxypiperidine-2-acetic acid lactone.

A solution of 19.4 g. of 3-amino-4-hydroxy-7-bromoheptanoic acid lactone hydrobromide in 635 cc. of chloroform and 46 cc. of triethylamine was allowed to stand for eighteen hours. After the addition of 11.5 cc. of benzoyl chloride, the solution was refluxed for one hour, then processed according to Example V; yield, 10.2 g. (65%) of white crystals of crude 1-benzoyl-3-hydroxypiperidine-2-acetic acid lactone having a melting point of about 99° C.–100° C.

Again other acid halides can be substituted for the benzoyl chloride employed in the above example, although, in some instances, difficulty is encountered in obtaining the resulting 1-acyl derivatives in crystalline form.

We claim:

1. Compounds selected from the group consisting of cis-3-hydroxypiperidine-2-acetic acid lactone, and acid addition salts thereof.

2. As a new composition of matter, *dl*-cis-3-hydroxypiperidine-2-acetic acid lactone.

3. As a new composition of matter, *d*-cis-3-hydroxypiperidine-2-acetic acid lactone.

4. As a new composition of matter, levo-cis-3-hydroxypiperidine-2-acetic acid lactone.

5. The acid addition salts of levo-cis-3-hydroxy-piperidine-2-acetic acid lactone.

6. As a new composition of matter, levo-cis-3-hydroxy-piperidine-2-acetic acid lactone hydrochloride.

7. As a new composition of matter, levo-cis-3-hydroxypiperidine-2-acetic acid lactone hydrobromide.

8. A method of preparing compounds selected from the group consisting of cis-3-hydroxypiperidine-2-acetic acid lactone, and acid addition salts thereof, which comprises contacting, under reactive conditions, a normal form of a 3-amino-4-hydroxy-7-haloheptanoic acid lactone salt with a member selected from the group consisting of lower trialkyl amines, N-ethylmorpholine, N-methylpiperidine, and N-methylpyrrolidine.

9. The method of claim 8 where the 3-amino-4-hydroxy-7-haloheptanoic acid lactone salt is 3-amino-4-hydroxy-7-bromoheptanoic acid lactone hydrobromide.

10. A method of preparing compounds selected from the group consisting of cis-3-hydroxypiperidine-2-acetic acid lactone, and acid addition salts thereof, which comprises contacting, in a substantially anhydrous, non-alcoholic, inert, organic solvent at a temperature of from about 0° C. to about 60° C., a normal form of a 3-amino-4-hydroxy-7-haloheptanoic acid lactone hydrohalide with a member selected from the group consisting of lower trialkylamines, N-ethylmorpholine, N-methylpiperidine, and N-methylpyrrolidine.

11. The method of claim 10 where the 3-amino-4-hydroxy-7-haloheptanoic acid lactone hydrohalide is 3-amino-4-hydroxy-7-bromoheptanoic acid lactone hydrobromide.

12. The method of claim 10 where the 3-amino-4-hydroxy-7-haloheptanoic acid lactone hydrohalide is 3-amino-4-hydroxy-7-chloroheptanoic acid lactone hydrochloride.

13. The method of claim 10 where the 3-amino-4-hydroxy-7-haloheptanoic acid lactone hydrohalide is 3-amino-4-hydroxy-7-iodoheptanoic acid lactone hydroiodide.

14. A method of preparing levo-cis-3-hydroxypiperidine-2-acetic acid lactone which comprises contacting, in a substantially anhydrous, non-alcoholic, inert organic solvent at a temperature of from about 0° C. to 60° C., a levo-normal-3-amino-4-hydroxy-7-haloheptanoic acid lactone hydrohalide with a member selected from the group consisting of lower trialkylamines, N-ethylmorpholine, N-methylpiperidine and N-methylpyrrolidine.

15. The method of claim 14 where said 3-amino-4-hydroxy-7-haloheptanoic acid lactone hydrohalide is levo-normal-3-amino-4-hydroxy-7-bromoheptanoic acid lactone hydrobromide.

No references cited.